Aug. 4, 1959 R. K. DAHLIN 2,898,557

TRANSISTORIZED VOLTAGE CONTROLLED OSCILLATOR

Filed Aug. 8, 1956 2 Sheets-Sheet 1

INVENTOR.
ROBERT K. DAHLIN

BY Harold J. Downes
ATTORNEY

Aug. 4, 1959 R. K. DAHLIN 2,898,557

TRANSISTORIZED VOLTAGE CONTROLLED OSCILLATOR

Filed Aug. 8, 1956 2 Sheets-Sheet 2

INVENTOR.
ROBERT K. DAHLIN

BY Harold J. Downes

ATTORNEY 2,898,557
Patented Aug. 4, 1959

2,898,557

TRANSISTORIZED VOLTAGE CONTROLLED OSCILLATOR

Robert K. Dahlin, Lakewood, Calif., assignor to North American Aviation, Inc.

Application August 8, 1956, Serial No. 602,756
13 Claims. (Cl. 331—109)

Figure 1:
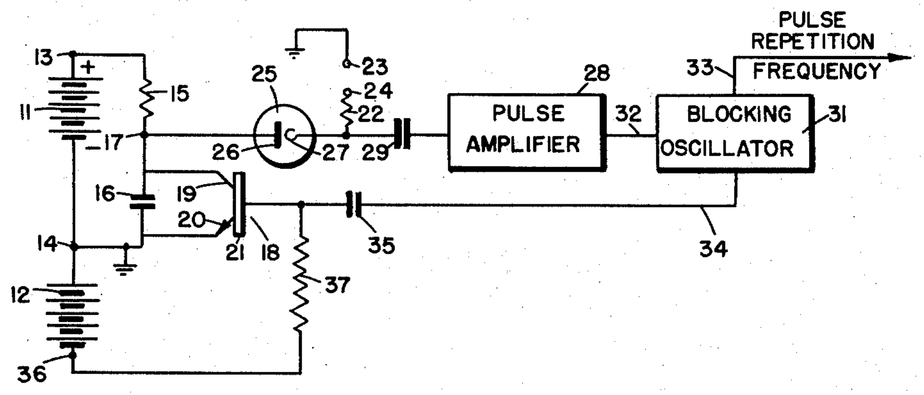

This invention relates to electronic circuits and concerns particularly circuits for precise control of time or frequency according to voltage.

In certain types of automatic controls an alternating current or a repetitive pulse wave is required, the frequency of which may be controlled very precisely in response to the voltage load of a control signal. Although condenser discharge circuits have been proposed for production of repeated pulses, and variations in voltage of the condenser charging circuit would tend to cause variations in the pulse repetition rate bearing some relation to the voltage of the charging circuit, there has been a problem in obtaining precise control in relation to voltage. Moreover, the art has been confronted with the problem of accomplishing satisfactory accuracy without excessively high-voltage charging circuits.

In addition, the art has been confronted with the need for a voltage controlled time base circuit which would respond to the level of a relaitvely low-voltage control signal rather than the magnitude of the high-voltage of a condenser charging source. Still another problem has been the avoidance of variations in pulse rate resulting from failure of a condenser to discharge fully upon each discharge and consequent failure of the condenser to start each charging cycle from the same point, viz, zero voltage.

There has been a need also for more compact, rugged, sturdy and light weight time base circuits than have heretofore been achieved with the considerations of weight, size and fragility imposed by the use of vacuum tubes and power supplies suitable for vacuum tube circuits.

An object of the invention is accordingly to provide an improved time-voltage reference or voltage controlled time base circuit and to overcome problems heretofore existing.

A further object of the invention is to provide a voltage controlled oscillator and, more specifically, a transistorized oscillator in which the frequency is controlled by voltage.

An additional object of the invention is to render negligible any effect upon circuit time or frequency characteristics of a tendency for transistor characteristic to vary with temperature.

Other and further objects, features and advantages of the invention will become apparent as the description proceeds.

In carrying out the invention in accordance with a preferred form thereof, a constant voltage source is provided wtih a resistor and condenser connected thereto in series and a transistor is connected across the condenser in such a manner that the transistor is normally nonconducting while the condenser is charging through the resistor.

A control voltage or signal input is provided at a pair of terminals, one of which is connected to the condenser side of the voltage supply or to a point having fixed potential relation thereto. A diode is connected between the other voltage signal input terminal and the junction terminal of the resistor and condenser in order to produce a pulse when the condenser voltage exceeds the level of the signal voltage.

A pulse generator, such as a blocking oscillator, is arranged to be triggered by the pulse at the diode preferably through a pulse amplifier and the blocking oscillator output is coupled to the base of the transistor in order to render the transistor conducting and discharge the condenser whenever its voltage has reached the level to correspond to the control signal. The pulse period can be made to depend primarily upon the value of the resistance and the condenser capacity and the ratio of the signal voltage to that of the source of charging current by proper circuitry. Pulse period and frequency may, therefore, be controlled precisely in accordance with the magnitude of the signal input voltage.

Figure 2:
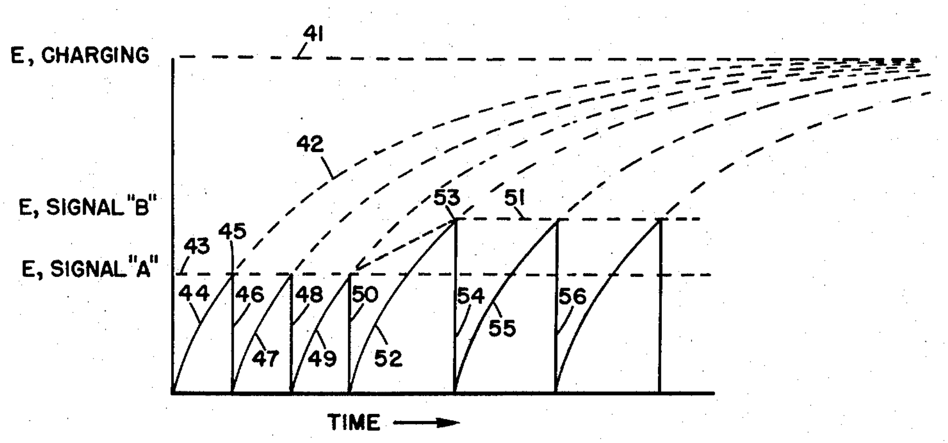
Figure 3:
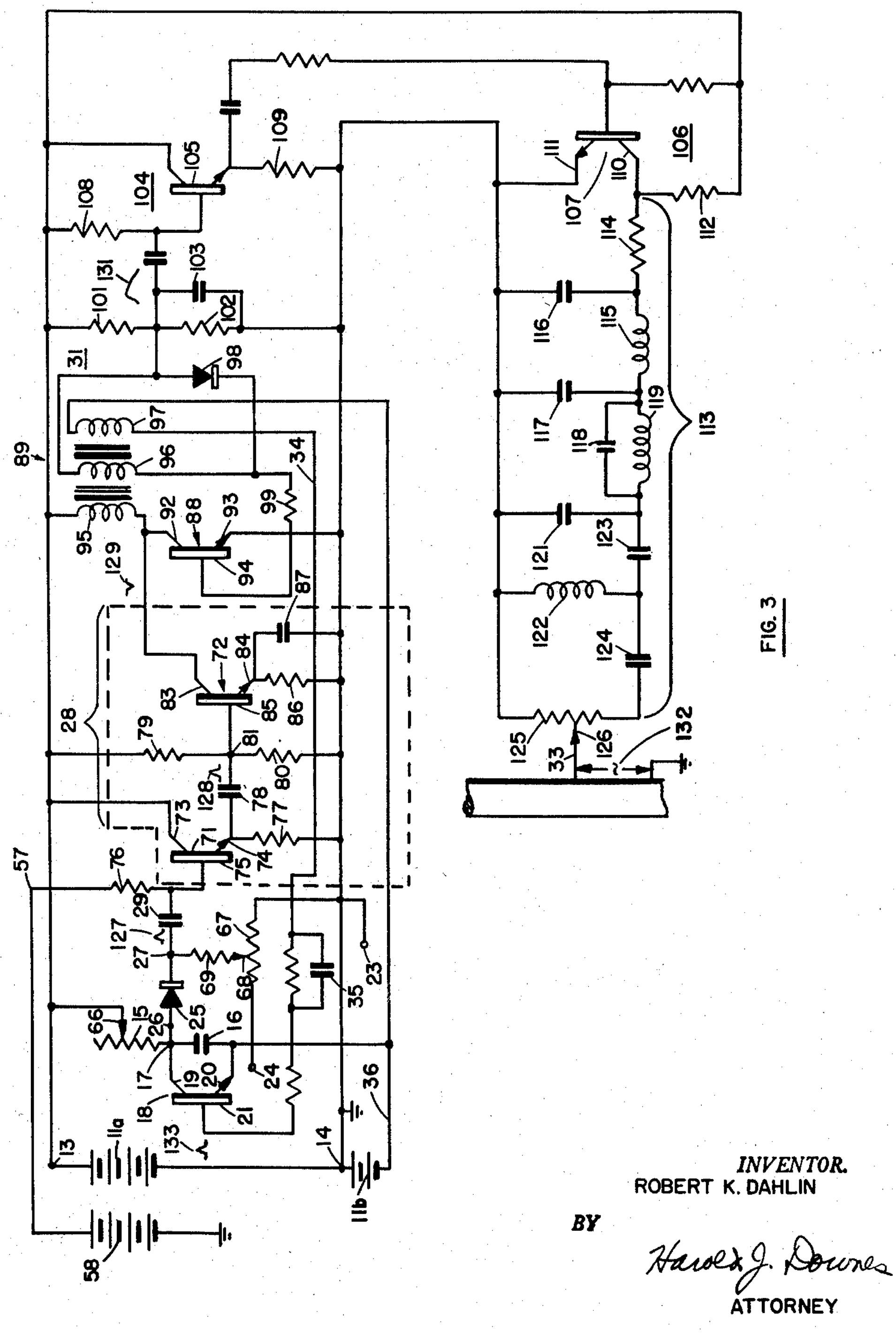

A better understanding of the invention will be afforded by the following description considered in conjunction with the accompanying drawings in which Fig. 1 is a circuit diagram of an embodiment of the invention;

Fig. 2 is a graph illustrating the principle of operation of the apparatus of Fig. 1; and Fig. 3 is a circuit diagram of another embodiment of the invention including elements for producing a sine wave having frequency accurately controlled by the magnitude of the input voltage signal.

Like reference characters are utilized throughout the drawing to designate like parts.

In the embodiment of Fig. 1, there is a source of charging current 11, shown by way of illustration as a battery. A source of bias voltage 12 is shown by way of illustration as a battery. A resistor 15 and a condenser 16, having a common terminal or junction terminal 17 are connected in series between the positive and negative terminals 13 and 14, respectively, of the charging current source 11. For periodically discharging the condenser 16, an electronic valve in the form of a transistor 18 is provided having an emitter 20 and a collector 19 connected to opposite plates of the condenser 16 and having a base 21. Although a transistor 18 has been illustrated and is well adapted to use in the circuit embodying the present invention, it is to be understood that the invention is not limited to the use of electronic valves of the transistor type and other forms of valves may be employed having control elements to which the base 21 corresponds.

For the sake of illustration, a junction type of transistor 18 of the NPN type is shown in Fig. 1. With suitable rearrangement of electrode connections, a junction transistor of the PNP type or point contact transistor of the N type may also be employed.

There is a pair of signal input terminals 23 and 24, one of which, for example, 23 is connected to a point having a fixed voltage relationship to the condenser charging current supply 11. For example, in the arrangement illustrated, its terminal 23 is grounded so as to be at the same potential as the negative terminal 14 of the battery 11, which is also grounded.

A unidirectional current-conducting device, such as a diode 25, which may be either an electronic valve or a semi-conductor type of rectifier is connected between the terminals 17 and 24 with such polarity that it becomes conducting only when the potential difference between the terminals 14 and 17 (across capacitor 16) become greater than that between the terminals 23 and 24, that is, greater than control signal voltage. In the form of circuit illustrated, the diode 25 has an anode 26 connected to the junction terminal 17 and a cathode 27 connected to the terminal 24. A pulse-voltage-forming resistor 22 is interposed between the diode terminal 27 and the signal terminal 24.

A pulse amplifier, illustrated in Fig. 1 by a rectangle 28, is provided for amplifying the pulse produced in the diode 25 at the point 27 when the voltage across capacitor 16 overcomes the signal voltage. This pulse is coupled by a condenser 29 to amplifier 28.

A blocking oscillator type of pulse generator, represented in Fig. 1 by a rectangle 31 is utilized, having an input channel 32 connected to the output of the pulse amplifier 28. There is an output channel 33 at which the pulse repetition frequency appears, and an output channel 34 coupled to the base 21 of the transistor 18 by a condenser 35. For normally biasing the base 21 negatively with respect to its emitter 20 and establishing the transistor 18 initially in non-conducting condition, the base 21 is connected to a negative terminal 36 of the negative bias supply 12 through a current limiting resistor 37.

Since the charging of the condenser through a resistor from a source of fixed voltage takes place along an exponential curve, a voltage-time curve for condenser voltages follows an exponential curve. By selection of the range of operation to approximately that shown in Fig. 2, compensation for the shape of the curve $$f=\frac{k}{T}$$

is obtained, where $f$ represents pulse frequency and T the time period between condenser discharges or pulses. If the condenser charging curve were linear with time, the period would vary linearly with control voltage. Ordinarily, however, linear variation of frequency is desired.

Accordingly, if the condenser voltage is kept in the range of ratios of the control signal voltages to the voltage of the charging circuit, illustrated in Fig. 2 condenser discharge frequency varies approximately linearly with condenser voltage.

As illustrated in Fig. 2, the dotted line 41 represents the potential difference between the terminals 13 and 14 of the charging current source 11 which is the asymtote of the exponential curve 42 representing the relationship between the voltage of the condenser 16 and the charging time. The condenser voltage is illustrated in a vertical direction and time in a horizontal direction. A signal voltage or potential difference between terminals 23 and 24 for a given signal of magnitude A is represented in Fig. 2 by a dotted line 43.

As shown in Fig. 2, the voltage of the condenser 16 follows a curve 44, shown by a full line to a point 45 at which the condenser voltage equals the signal voltage upon which the condenser voltage overtakes signal voltage and produces a current pulse and voltage drop across the resistor 22 amplified by the pulse amplifier 28. This serves to trigger the blocking oscillator 31 through its input line 32 so as to supply positive voltage to the base 21 of the transistor 18 and momentarily render it conducting. This causes the condenser 16 to discharge and its voltage to fall abruptly along the line 46. The curve 46 is very steep and of very short duration owing to the high conductivity of the transistor 18. So long as the signal voltage between the signal input terminals 23 and 24 is maintained at the fixed value of signal A, the condenser potential continues to follow a sharp, steep sawtoothed wave represented by the lines 44, 46, 47, 48, 49, and 50.

However, if after the discharge along the line 50 has taken place, the voltage between the signal input terminals 23 and 24 should be raised to a new level represented by signal B and a horizontal dotted line 51, the condenser 16 will rise in voltage along the line 52 to a point 53 on the horizontal line 51 whereupon it abruptly descends along the substantially vertical line 54. Then, so long as the signal level remains at the value B, the voltage time curve of the condenser 16 will continue to follow a saw-toothed wave 52, 54, 55, 56, etc. It is to be observed that the intervals of the saw-toothed wave are increased proportionately to the increase in signal voltage where a small fractional change in voltage is involved. On the other hand, the reciprocal frequency varies linearly with voltage when, as shown, the condenser voltage is varied in the range illustrated. Accordingly, the circuit of Fig. 1 represents an accurate time base in which the time period may be fixed precisely in response to the magnitude of the voltage signal.

A transistor is essentially a zero resistance element when it is rendered conductive. By utilization of this property, a highly precise device for determining time period by the charging of a condenser through a resistor from a fixed voltage and discharge thereof has been achieved. Since a transistor is an efficient device even at minute applied voltages, the timing capacitor can be discharged to such a small voltage that temperature variations in the transistor will have negligible effects on the overall accuracy; for instance, 10% variations in this minimum voltage, which is an extremely small percentage of the total charge voltage, will have a completely negligible effect on the overall accuracy. It is, therefore, unnecessary to use very large voltages when charging the condenser circuit in order to compensate for variations in the condenser discharge switch or element which might be the case if the condenser discharging element had an appreciable voltage drop across it when it became conducting.

In consequence of the low resistance characteristics of the transistor, the curves 46, 48, 50, 54 and 56 of Fig. 2, drop to zero and the exponential curves 44, 47, 49, 52 and 55 rise from zero points. Moreover, owing to the use of a pulse generator 31 having a very short pulse duration, the saw-tooth wave of Fig. 2 is very sharp at the bottom and each exponential curve rises from the intersection with the zero axis of the lines 46, 48, 50, 54 and 56, etc.

Other circuit arrangements may also be employed in which an electronic valve controls the discharge of a condenser in response to comparison between a signal voltage and a condenser voltage, and the invention is not limited to the precise specific arrangement illustrated in Fig. 1.

Another illustration of the use of NPN type transistors is shown in Fig. 3 in which the charging resistor 15 is shown as being adjustable with a tap 66.

In the arrangement of Fig. 3, the relationship of the control voltage to the input to the circuit is made adjustable by providing a potentiometer 67 connected between the input signal terminals 23 and 24 having a tap 68 connected to the cathode 27 through a resistor 69. The condenser-charging source 11 may actually be divided into two parts represented schematically in the diagram by batteries 11_a_ and 11_b_ in order to bring the input signal voltage reference to zero volts with respect to ground.

The pulse amplifier 28 comprises two stages of NPN type transistors 71 and 72 which are resistance-capacitor coupled. The transistor 71 comprises a collector 73, an emitter 74 and a base 75, the latter being connected to a positive terminal 57 through a resistor 76. A load resistor 77 is connected in the emitter circuit. Preferably a separate power supply 58 having the positive terminal 57 is provided for the amplifier stages so that the voltage of the source 11_a_—11_b_ may remain accurately constant, supplying only the low-drain circuit comprising the resistor 15 and the condenser 16.

The transistor 72 is coupled to the load resistor 77 through a coupling condenser 78 and a voltage divider consisting of resistors 79 and 80 with a junction terminal 81. The transistor 72 comprises a collector 83, an emitter 84 and a base 85, connected to the junction terminal 81 of the voltage divider 79 and 80. There is a load resistor 86 connected in the emitter lead, by-passed by a condenser 87 which prevents degenerative feedback by preventing A.-C. variation of the emitter 84.

The blocking oscillator 31 comprises an NPN type junction transistor 88 and a transformer 89. The transistor 88 comprises a collector 92, an emitter 93 and a base 94. The transformer 89 is of the three-winding type having windings 95, 96 and 97. The winding 95 is connected in series with the collector 92 and the emitter 93 across the supply 58. To absorb the overshoot of the blocking oscillator, the winding 96 is shunted by a diode 98. It is connected through a resistor 99 to the base 94 at one end and at the other end is connected through a resistor 101 to the positive power supply terminal 57 for positively biasing the base 94. For maintaining the base 94 at ground potential with respect to alternating current, a resistor 102 is connected in series with the resistor 101 to the ground connection 14 and is shunted by a by-pass condenser 103. The winding 97 is coupled to the base 21 of the transistor 18.

A further stage of amplification 104 is provided comprising a transistor 105, and a stage 106 is provided comprising a transistor 107 which is resistor-capacitor coupled. In the stage 104 there is a positive bias resistor 108 and a load resistor 109. The stage 106 has an emitter 111 connected to the ground terminal 14 and a collector 110 connected to the positive terminal 57 through a resistor 112.

For filtering the output of the stage 106, appearing between the collector 110 and the emitter 111, a filter circuit 113 of conventional design is provided. The filter consists of a low-pass section for eliminating higher harmonic content and a high-pass section to minimize amplitude modulation of the output by the signal. In the form shown there is a resistor 114, an inductance 115, condensers 116, 117, 118, an inductance 119, a condenser 121, an inductance 122 and condensers 123 and 124. An amplitude control resistor 125 is connected across the output, having a tap 126 serving to provide adjustable amplitude sine wave output at the lead 33.

The shape of the pulse appearing at the terminal 27 when the potential of the condenser 16 reaches that of the terminal 27 of the diode 25 is represented by 127 in Fig. 3. The pulse is amplified as curve 128 at terminal 81 and inverted to produce waveform 129 at the collector 83. A broad, stretched blocking-oscillator pulse 131 results at diode 98, which is converted to a sine wave 132 at output 333. A sharp pulse 133 also appears upon the base 21 of the transistor 18, synchronous with the pulse 131 due to the feedback connection from winding 97 to base 21.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A voltage-responsive time base generator comprising the combination of a resistor and a condenser connected in series, having a junction terminal and adapted to be connected to a source of charging current, first and second control signal input terminals, a diode connected through a resistor between the first of said signal terminals and the junction of said resistor and condenser, an electronic valve having current-carrying terminals connected on either side of the condenser and having a control element, a pulse amplifier coupled to the said first input signal terminal, a blocking oscillator coupled to the pulse amplifier and having output terminals capacitively coupled to the control element of said electronic valve, said control element being biased to non-conducting condition of the electronic valve, whereby charging of said condenser to a potential corresponding to the potential of the input signal at said input signal terminals results in a current impulse through the diode which is amplified by the pulse amplifier to trigger the blocking oscillator and momentarily render the electronic valve conducting and whereby the condenser is periodically discharged at the end of successive intervals determined by the ratio of the input signal to charging voltage and the constants of the said resistor-condenser circuit.

2. A voltage-responsive time base circuit comprising the combination of a resistor and condenser connected in series having a common junction terminal and adapted to be connected to a source of charging current, an electronic valve connected across the condenser and having a control element, means for biasing the control element to a potential at which the electronic valve is non-conducting, first and second voltage signal input terminals, a pulse generator, means including a diode coupled between said junction terminal and one of said input terminals for comparing the signal voltage with the condenser voltage for triggering said pulse generator when the condenser voltage reaches the signal voltage, and means for coupling the pulse generator to the control element of the electronic valve and rendering it conducting to discharge the condenser whenever a signal pulse is applied to the pulse generator from the input signal terminal.

3. A voltage-responsive time base circuit comprising the combination of a resistor and a condenser connected in series having a common junction terminal and adapted to be connected to a source of charging current, an electronic valve connected across the condenser having a control element, means for biasing the control element to a potential at which the valve is non-conducting, first and second voltage signal input terminals, a blocking oscillator, means for triggering said blocking oscillator when the condenser voltage reaches the voltage of the signal terminals, said triggering means including a diode coupled between one of said input terminals and said junction terminal, and means for coupling the blocking oscillator to the control element of the electronic valve for rendering it conducting to discharge the condenser whenever the condenser voltage reaches the voltage at the input signal terminals.

4. A voltage-responsive time base circuit comprising the combination of a resistor and condenser connected in series, having a common junction terminal and adapted to be connected to a source of charging current, first and second voltage signal input terminals, means for comparing the signal voltage with the condenser voltage and producing a pulse when the condenser voltage reaches the signal voltage, said means including a unidirectional current conducting device coupled between one of said input terminals and said junction terminal, and means for recycling after each pulse.

5. The combination recited in claim 4 wherein said means for recycling comprises means for discharging said capacitor in response to said pulse.

6. A resistor and a condenser connected in series and having a junction terminal, a transistor having a collector and an emitter connected on either side of the condenser and having a base, first and second voltage input signal terminals, a unidirectional device connected between the first terminal and the junction terminal for producing a pulse when the condenser voltage reaches that across the input signal terminals, a blocking oscillator coupled to said first signal input terminal whereby it is triggered in response to a pulse occurring at said terminal, means for biasing the base of said transistor to a potential at which the transistor is non-conducting, and a coupling from the blocking oscillator to said base for overcoming said bias and rendering the transistor conducting to discharge the condenser whenever a pulse from the signal input terminal is applied to the blocking oscillator.

7. A voltage-responsive time base circuit comprising the combination of a negative power supply terminal and a positive power supply terminal, a junction terminal, a resistor connected between the positive supply terminal and the junction terminal, a condenser connected between the junction terminal and the negative supply terminal, a transistor of the type in which current normally flows from the emitter to the collector in an external circuit, having its collector connected to said junction terminal and its emitter connected to said negative supply terminal and having a base, first and second input terminals, the second being connected in fixed voltage relationship to said negative supply terminal, a unidirectional current-conducting device connected between said junction terminal and said first input terminal, a blocking oscillator coupled to said first input terminal, means coupling the blocking oscillator to the base of said transistor, and means for normally biasing the base to prevent it from conducting whereby the attainment of junction terminal potential by said first signal terminal results in a curent impulse through said unidirectional curent device to trigger the blocking oscillator and overcome negative bias base of said transistor, thereby causing the condenser to be discharged through said transistor after a time interval determined by the potential difference between said input signal terminals.

8. A voltage-responsive time base circuit comprising the combination of a negative power supply terminal and a positive power supply terminal, a junction terminal, a resistor connected between the junction terminal and the positive terminal, a condenser connected between the junction terminal and the negative terminal, a transistor of the type in which current flows from the collector to the emitter in the external circuit having a collector connected to said junction and an emitter connected to said positive terminal, and having a base biased to a potential rendering the transistor non-conductive, a blocking oscillator coupled to said junction terminal, means for triggering said blocking oscillator when the junction terminal attains a predetermined voltage, and means coupling the blocking oscillator to the base of the transistor for rendering it conducting in response to triggering of the blocking oscillator for discharging the condenser at the end of a time interval determined by the magnitude of said predetermined voltage.

9. A voltage-responsive time base circuit comprising in combination first and second power supply terminals, a junction terminal, a resistor connected between first terminal and the junction terminal, a condenser connected between the junction terminal and the second terminal, a transistor having a collector and an emitter connected across the condenser and having a base biased to a potential rendering the transistor non-conductive, a blocking oscillator, means for triggering said blocking oscillator when the potential difference across the condenser attains a predetermined value, and means coupling the blocking oscillator to the base of the transistor for rendering it conducting in response to the triggering of the oscillator for discharging the condenser at the end of the time interval determined by magnitude of said predetermined voltage value.

10. A voltage-responsive time base circuit comprising the combination of power supply terminals, a condenser and a resistor connected between said power supply terminals and having a junction terminal, a transistor connected across the condenser having a control element, the potential of which controls the conductivity of the transistor, means normally biasing said element to a potential rendering the transistor non-conducting, a signal input terminal, a diode connected between said junction terminal and said signal input terminal, a transistor amplifier having a control element coupled to said signal input terminal, whereby a pulse is produced on the signal terminal, when the condenser voltage attains the voltage of the signal input terminal, and the pulse is amplified by the transistor amplifier, a blocking oscillator comprising a transistor and a transformer with a winding connected in series with the blocking oscillator transistor, a winding connected to the control element of the blocking oscillator transistor and a winding coupled to the control element of said first transistor, whereby said pulse triggers the blocking oscillator, which overcomes the bias of the control element of the first transistor to discharge the condenser at time intervals dependent on the magnitude of the voltage applied to the input signal terminal.

11. Apparatus as in claim 10 wherein a filtering circuit is coupled to the blocking oscillator for producing a sine wave voltage having a frequency dependent upon the repetition rate of the blocking oscillator, which in turn is determined by the discharge rate of said condenser.

12. Voltage responsive time base apparatus comprising a condenser having a charging circuit and a normally inoperable discharging circuit, a pulse forming circuit having input and output terminals, a unidirectional device coupled between said input terminal and one side of said condenser, and means coupled with said output terminal for operating said discharging circuit whereby a condenser charge of predetermined value will be coupled by said device to said pulse forming circuit to operate said discharging circuit and discharge said condenser.

13. Voltage responsive time base apparatus comprising a condenser having a charging circuit and a normally inoperable discharging circuit, a pulse forming circuit having input and output terminals, a unidirectional device coupled between said input terminal and one side of said condenser, means coupled with said output terminal for operating said discharging circuit whereby a condenser charge of predetermined value will be coupled by said device to said pulse forming circuit to operate said discharging circuit and discharge said condenser, and means for coupling a source of control signal to that side of said device which is coupled to said pulse forming circuit.

References Cited in the file of this patent

UNITED STATES PATENTS

| | | |
|---|---|---|
| 2,153,217 | Van der Mark | Apr. 4, 1939 |
| 2,557,770 | Scoles | June 19, 1951 |
| 2,663,800 | Herzog | Dec. 22, 1953 |
| 2,679,594 | Fromm | May 25, 1954 |
| 2,726,329 | Henderson | Dec. 6, 1955 |
| 2,767,378 | Hass | Oct. 16, 1956 |
| 2,780,767 | Janssen | Feb. 5, 1957 |
| 2,797,327 | Kidd | June 25, 1957 |